US012795649B2

(12) United States Patent
Parkvall et al.

(10) Patent No.: US 12,795,649 B2
(45) Date of Patent: Nov. 10, 2026

(54) COMMUNICATION OF SPIKING DATA ON RADIO RESOURCES

(71) Applicant: Telefonaktiebolaget LM Ericsson (publ), Stockholm (SE)

(72) Inventors: Stefan Parkvall, Bromma (SE); Robert Baldemair, Solna (SE); Tamas Borsos, Budapest (HU); András Rácz, Budapest (HU); András Veres, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 18/839,099

(22) PCT Filed: Feb. 22, 2022

(86) PCT No.: PCT/SE2022/050188
§ 371 (c)(1),
(2) Date: Aug. 16, 2024

(87) PCT Pub. No.: WO2023/163619
PCT Pub. Date: Aug. 31, 2023

(65) Prior Publication Data
US 2025/0184991 A1 Jun. 5, 2025

(51) Int. Cl.
*H04W 72/1263* (2023.01)
*G06N 3/049* (2023.01)
(Continued)

(52) U.S. Cl.
CPC ........ *H04W 72/1263* (2013.01); *G06N 3/049* (2013.01); *G06N 3/063* (2013.01); *H04B 7/0413* (2013.01)

(58) Field of Classification Search
CPC ... H04W 72/1263; G06N 3/049; G06N 3/063; H04B 7/0413
See application file for complete search history.

(56) References Cited

U.S. PATENT DOCUMENTS

2013/0226851 A1* 8/2013 Hunzinger ............. G06N 3/049 706/25
2014/0241211 A1* 8/2014 Zhang .................... G06N 3/063 370/255
(Continued)

OTHER PUBLICATIONS

Skatchkovsky, et al., "End-to-End Learning of Neuromorphic Wireless Systems for Low-Power Edge Artificial Intelligence," Asilomar Conference on Signals, Systems, and Computers, Sep. 2020, Pacific Grove, California, IEEE, 10 pages.
(Continued)

*Primary Examiner* — Ivan O Latorre
(74) *Attorney, Agent, or Firm* — Withrow & Terranova, PLLC

(57) ABSTRACT

Embodiments of the present disclosure provide a method for communication of spiking data on radio resources. The method is performed by a neuromorphic transmitter node. The method comprises obtaining the spiking data representing one or more spikes generated by a neuromorphic application. Each spike is associated with an identity of a neuron emitting the spike. The method further comprises mapping the spiking data to the radio resources. The spiking data is mapped to one or more radio resource elements based on one or more of: the identity of the neuron, transmission properties of the one or more spikes and availability of the radio resources. Corresponding neuromorphic transmitter node, neuromorphic receiver node and computer program products are also disclosed.

16 Claims, 7 Drawing Sheets

(51) Int. Cl.
*G06N 3/063* (2023.01)
*H04B 7/0413* (2017.01)

(56) References Cited

U.S. PATENT DOCUMENTS

| | | | | |
|---|---|---|---|---|
| 2017/0229117 | A1* | 8/2017 | van der Made | G10L 25/78 |
| 2018/0174042 | A1* | 6/2018 | Srinivasa | G06N 3/045 |
| 2020/0143229 | A1* | 5/2020 | Van Der Made | G06N 3/0464 |
| 2021/0160109 | A1* | 5/2021 | Seol | G06N 3/063 |
| 2023/0325001 | A1* | 10/2023 | Gigie | G01S 15/876 345/156 |
| 2023/0334300 | A1* | 10/2023 | Banerjee | G06N 3/049 |
| 2023/0388856 | A1* | 11/2023 | Yan | H04W 28/24 |
| 2025/0024434 | A1* | 1/2025 | Veres | H04L 27/2627 |
| 2025/0184991 | A1* | 6/2025 | Parkvall | G06N 3/049 |
| 2026/0030491 | A1* | 1/2026 | Banerjee | G06N 3/0455 |

OTHER PUBLICATIONS

Extended European Search Report for European Patent Application No. 22929113.3, mailed Oct. 27, 2025, 7 pages.
Borsos, et al., “Resilience Analysis of Distributed Wireless Spiking Neural Networks,” Wireless Communications and Networking Conference, Dec. 16, 2021, IEEE, 6 pages.
Hiraoka, et al., “Implementation of Spiking Neural Network with Wireless Communications,” Neural Information Processing, Dec. 5, 2019, Springer Nature Switzerland, 8 pages.
International Search Report and Written Opinion for International Patent Application No. PCT/SE2022/050188, mailed Nov. 7, 2022, 14 pages.

* cited by examiner

COMMUNICATION OF SPIKING DATA ON RADIO RESOURCES

This application is a 35 U.S.C. § 371 national phase filing of International Application No. PCT/SE2022/050188, filed Feb. 22, 2022, the disclosure of which is incorporated herein by reference in its entirety.

TECHNICAL FIELD

The present disclosure relates generally to the field of spiking neural network. More particularly, it relates to methods, transmitter node, receiver node, and computer program products for communication of spiking data on radio resources.

BACKGROUND

In general, spiking neural networks, SNNs are artificial neural networks which closely mimic natural neural networks. A SNN is a collection of many hundreds or thousands of such neurons, which are inter-connected via synapses. In SNNs, all the information carried between neurons are represented by spikes. A spike is considered as a binary data, where the presence of a spike implicitly carries the information. A spike is generated by a change in intensity level detected at the neurons. Some of the examples of devices generating the spikes are neuromorphic or event camera, neuromorphic control system, skin or touch sensors, robotic arms, or the like. Other types of sensors, such as artificial cochlea, skin or touch sensors are directly generating spikes as output signal, or actuators, like robotic arms, which can be controlled via spike signals. There are also chips executing neuromorphic computing as opposed to traditional arithmetic compute, suitable to process e.g., the outputs of neuromorphic sensors.

FIG. 1 shows a neuron model having a plurality of inter-connected neurons. As explained above, the SNN is a collection of multiple neurons which are inter-connected via synapses. Each spike received on any of the input synapses 10*a*-10*d* of the neuron 12 (weighted with the synapse weight) ($w_1$-$w_n$), increases the voltage potential of the neuron. When the increased voltage potential reaches a threshold voltage, the neuron 12 emits an output spike 14.

With the increased usage of SNNs, communication of spiking data over a wireless link is gaining importance. There are multiple scenarios where the communication of spiking data over a communication network becomes necessary.

In the wireless communication network, due to the nature of spike-based communication and its communication features, special requirements need to be formulated for the radio technology to effectively support distributed neuromorphic-based applications. The unique properties altogether create a special situation regarding the communication requirements of spiking data, which none of the existing access and resource sharing scheme can fulfil in an optimal way.

SUMMARY

The usage of existing radio transmission schemes and protocols developed for digital mobile data are highly inefficient due to large protocol overheads and heavy protocol procedures required for the spiking data. Further, in case of spiking data, the existing radio transmission schemes and protocols are non-scalable for large number of burst and small spiking data. Moreover, the strict timing accuracy requirements of spiking data (e.g., sub ms level) would not be possible to guarantee with current transmission procedures including delays due to protocols, scheduling, and retransmissions, etc.

Consequently, there is a need for a mechanism on how to transmit the spiking data over a wireless communication network. Further, an improved method and arrangement for communication of the spiking data is needed that alleviates at least some of the above cited problems.

It is therefore an object of the present disclosure to provide a method, a neuromorphic transmitter node, a neuromorphic receiver node and a computer program product for communication of the spiking data to mitigate, alleviate, or eliminate all or at least some of the above-discussed drawbacks of presently known solutions.

This and other objects are achieved by means of a method, a neuromorphic transmitter node, a neuromorphic receiver node and a computer program product as defined in the appended claims. The term exemplary is in the present context to be understood as serving as an instance, example or illustration.

According to a first aspect of the present disclosure, a method for communication of spiking data on radio resources is disclosed. The method is performed by a neuromorphic transmitter node in a wireless communication network. The method comprises obtaining the spiking data representing one or more spikes generated by a neuromorphic application. Each spike is associated with an identity of a neuron emitting the spike. The method further comprises mapping the spiking data to the radio resources. The spiking data is mapped to one or more radio resource elements based on one or more of: the identity of the neuron, transmission properties of the one or more spikes and availability of the radio resources.

In some embodiments, the method further comprises transmitting a signal indicating a firing event of one or more neurons, on the one or more radio resource elements.

In some embodiments, the radio resources comprise one or more of: time domain resources, frequency domain resources, code domain resources, and spatial resources.

In some embodiments, the spatial resources correspond to transmission ranks in multi-layer multiple-input and multiple-output, MIMO, transmission mode.

In some embodiments, the step of transmitting a signal indicating the firing event of one or more neurons, on the one or more radio resource elements comprises identifying a time interval associated with the firing event. The method further comprises encoding one or more of: identity of the neuron and the time interval.

In some embodiments, the method comprises detecting a firing event when a plurality of neurons fire simultaneously and determining individual signals indicating the firing event at each of the plurality of neurons. The method further comprises determining a sum of the individual signal values and transmitting the sum of the individual signal values on the one or more radio resource elements.

In some embodiments, the step of mapping the spiking data to the radio resources comprises mapping the signal to a single radio resource corresponding to one sub-carrier in one orthogonal frequency-division multiplexing, OFDM, symbol.

In some embodiments, the identity of the neuron emitting the spike is mapped to one sub-carrier in one OFDM symbol.

In some embodiments, the step of mapping the spiking data to the radio resources comprises identifying the identity of the neuron emitting the spike and determining the one or more radio resource elements among a plurality of radio resource elements from the identity of the neuron. The method further comprises mapping the identity of the neuron to the one or more radio resource elements.

In some embodiments, the step of mapping the spiking data to the radio resources comprises identifying the identity of the neuron emitting the spike and determining a hash for the identity of the neuron using a hashing function. The method further comprises determining the one or more radio resource elements from a plurality of radio resource elements based on the hash.

According to a second aspect of the present disclosure, a method for reception of spiking data is provided. The method is performed by a neuromorphic receiver node in a wireless communication network. The method comprises receiving the spiking data representing one or more spikes over radio resources from a neuromorphic transmitter node, wherein each spike is associated with an identity of a neuron emitting the spike. The method comprises identifying the radio resources for obtaining the spiking data. The one or more spikes are obtained by identifying one or more radio resource elements for obtaining the one or more spikes.

In some embodiments, the radio resources comprise one or more of: time domain resources, frequency domain resource, code domain resource, and spatial resources.

In some embodiments, the step of identifying the radio resources for obtaining the spiking data comprises determining a signal indicating one or more spikes on the one or more radio resource elements. The method further comprises decoding the signal on the one or more radio resource elements for determining an identity of each neurons, a time interval associated with a firing event of each neuron.

In some embodiments, the step of identifying the radio resources for obtaining the spiking data comprises detecting presence of power on the one or more radio resource elements without performing demodulation of the one or more radio resource elements.

According to a third aspect of the present disclosure, an apparatus of a neuromorphic transmitter node configured to operate in a wireless communication network for communication of spiking data on radio resources is provided. The apparatus comprising a controlling circuitry configured to cause obtaining of the spiking data representing one or more spikes generated by a neuromorphic application. Each spike is associated with an identity of a neuron emitting the spike. The controlling circuitry is configured to cause mapping of the spiking data to the radio resources. The spiking data is mapped to one or more radio resource elements based on one or more of: the identity of the neuron, transmission properties of the one or more spikes and availability of the radio resources.

A fourth aspect is a neuromorphic transmitter node comprising the apparatus of the third aspect.

According to a fifth aspect of the present disclosure, an apparatus for a neuromorphic receiver node configured to operate in a wireless communication network for reception of spiking data is provided. The apparatus comprising a controlling circuitry being configured to cause reception of the spiking data representing one or more spikes over radio resources from a neuromorphic transmitter node. Each spike is associated with an identity of a neuron emitting the spike. Further, the controlling circuitry is configured to cause identification of the radio resources for obtaining the spiking data. The one or more spikes are obtained by identifying one or more radio resource elements for obtaining the one or more spikes.

A fifth aspect is receiver node comprising the apparatus of the fourth aspect.

According to a sixth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

In some embodiments, any of the above aspects may additionally have features identical with or corresponding to any of the various features as explained above for any of the other aspects.

An advantage of some embodiments is that alternative and/or improved approaches are provided for communication of spiking data on the radio resources.

An advantage of some embodiments is that the unique properties of spikes are considered in the communication of spiking data in the wireless transmission scheme. Thus, the spiking data can be communicated in the wireless communication network more efficiently.

An advantage of some embodiments is that alternative and/or improved approaches are provided for transmission of the spiking data with minimum overhead.

An advantage of some embodiments is that alternative and/or improved approaches are provided for transmission of the spiking data such that the timing properties of the spikes are maintained.

An advantage of some embodiments is that alternative and/or improved approaches are provided for optimizing the procedure of radio resource mapping for the special properties and the requirements of the spiking data.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
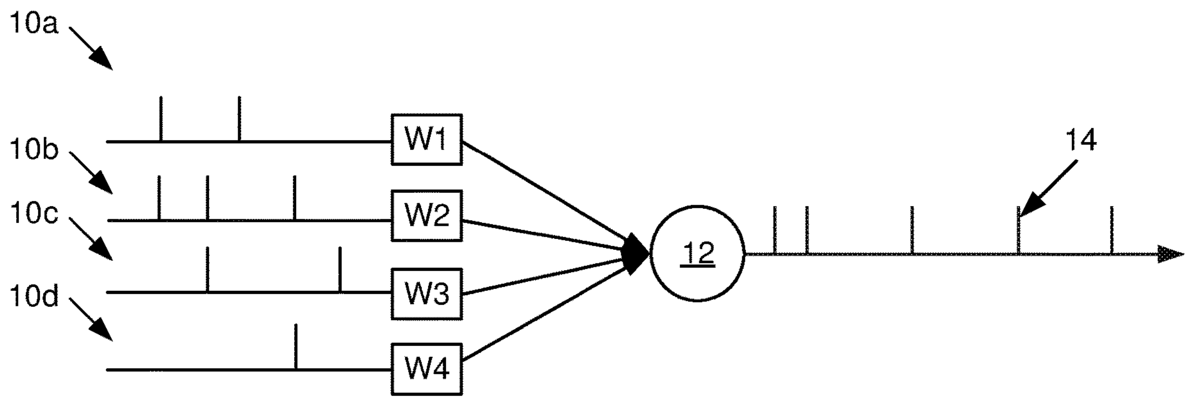
FIG. 1 discloses an example neuron model.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, receiver nodes, also known as mobile terminals, user equipment (UE) and/or wireless terminals, are enabled to communicate wirelessly with a transmitter node in a wireless communication network.

In the present disclosure, it is assumed that connection establishment has already been completed between the receiver node(s) and the transmitter node.

In the following description of exemplary embodiments, the same reference numerals denote the same or similar components.

Figure 2A:
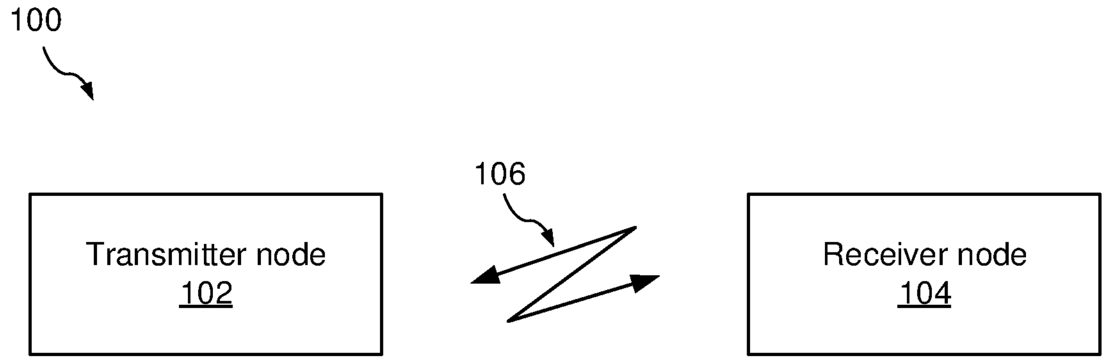
FIG. 2A discloses an example wireless communication network according to some embodiments.

FIG. 2A discloses an example communication network in the form of a wireless communication network 100. As depicted in FIG. 2A, the wireless communication network 100 includes a transmitter node 102 and a receiver node 104.

For downlink transmission, the transmitter node 102 may be a neuromorphic transmitter node or a base station, and the receiver node 104 may be a neuromorphic receiver node, a wireless device or a remote station. For uplink transmission, the transmitter node 102 may be a wireless device, and the receiver node 104 may be a base station. The base station is generally a fixed station that communicates with the wireless devices and may also be referred to as base station i.e., a gNB or a Node B, an evolved Node B (eNode B), an access point, etc. The wireless device may be stationary or mobile and may also be referred to as a remote station, a mobile station, user equipment, mobile equipment, a terminal, a remote terminal, an access terminal, a station, etc. The wireless device may be a cellular phone, a personal digital assistant (PDA), a wireless modem, a wireless communication device, a handheld device, a subscriber unit, a laptop computer, event camera, robotic arm, skin or touch sensor, neuromorphic device, etc., The receiver node 104 communicates with the transmitter node 102 serving the receiver node 104.

Although not shown in FIG. 2A, there may be a plurality of receiver nodes 104*a*-104*n* in the coverage of the transmitter node 102.

To facilitate communications, different communication channels are established between the transmitter node 102 and the receiver node 104. When the transmitter node 102 has spiking data to be transmitted to the receiver node 104, the transmitter node 102 transmits the data packets using access and resource sharing scheme.

In SNNs, the spiking data represents one or more spikes generated by a neuromorphic application. The neuromorphic application is an application which outputs spikes based on a change in intensity detected at the neuron. In scenarios, where components in SNN are wirelessly communicating to each other, the radio technology needs to have some unique capability. The unique capability may comprise low delay and low jitter to preserve the time sensitive aspect of spike information encoding, medium access and resource allocation methods must support unpredictable and bursty traffic patterns, both uni-cast and group-cast communication will be needed to effectively support dense, local inter-neuron connectivity, usual loss and Block Error Rate, BLER, mitigation algorithms, like radio retransmission or large transmission buffer sizes may be applied only with significant limitations.

In wireless communication 100, due to the nature of spike-based communication and its communication features, special requirements need to be formulated for the radio technology to effectively support distributed neuromorphic-based applications. As a result, when the data packets to be transmitted by the transmitter node 102 comprises the spiking data, the existing access and resource sharing scheme may not be optimal technique to transmit the data packets having the spiking data.

Therefore, according to some embodiments of the present disclosure, the neuromorphic transmitter node 102 implements a method for communication of the spiking data on radio resources to the receiver node 104. Furthermore, the neuromorphic receiver node 104 may implement a method for reception of the spiking data.

In at least some implementations, the neuromorphic transmitter node 102 obtains the spiking data representing one or more spikes generated by the neuromorphic application. In some examples, the neuromorphic application can be executed in the transmitter node 102. Each spike is associated with an identity of a neuron emitting the spike. For example, the identity of the neuron may be an address used to identify the neuron which emits the spike.

Further, the neuromorphic transmitter node 102 maps the spiking data to the radio resources. The spiking data is mapped to the radio resources based on one or more of the identity of the neuron, transmission properties of the one or more spikes and availability of the radio resources. The neuromorphic transmitter node 102 identifies one or more radio resource elements among a plurality of radio resource elements using the identity of the neuron. The plurality of radio resource elements are associated with one or more radio resources. For example, the radio resources comprise one or more of time domain resources, frequency domain resources, code domain resources, and spatial resources.

In some examples, the transmission properties associated with each spike comprises one or more of: an arrival time, an allowed spiking delay, a spiking loss associated with each spike, spiking latency for a group of spikes, a delivery time determined for each spike and a priority level of each spike.

Furthermore, the neuromorphic transmitter node 102*a* transmits a signal indicating a firing event of one or more neurons on the one or more radio resource elements. The firing event is associated with an event when the neuron fires or when the neuron emits the spike. For example, the signal represents an occurrence or non-occurrence of the firing event. The signal is transmitted to the receiver node through a communication channel 106. Various embodiments for communication of spiking data on radio resources are explained in conjunction with figures in the later parts of the description.

In at least some implementations, the neuromorphic receiver node 104 receives the spiking data representing one or more spikes over radio resources from the neuromorphic transmitter node 102. Each spike is associated with an identity of a neuron emitting the spike.

Further, the neuromorphic receiver node 104 identifies the radio resources for obtaining the spiking data. The one or more spikes are obtained by identifying one or more radio resource elements for obtaining the one or more spikes. Various embodiments for communication of spiking data on radio resources are explained in conjunction with figures in the later parts of the description.

Therefore, the unique properties of spikes are considered in the communication of spiking data in the wireless transmission scheme. Thus, the spiking data can be communicated in the wireless communication network more efficiently. Thus, an alternative and improved approaches are provided for communication of spiking data on the radio resources.

Figure 2B:
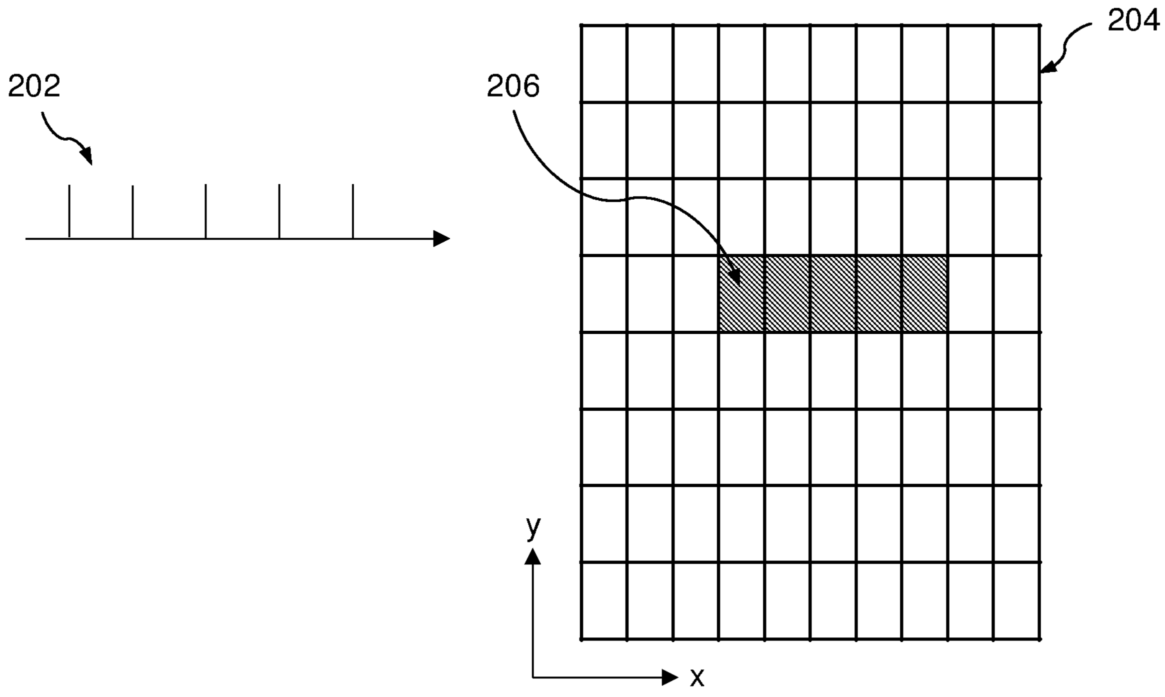
FIGS. 2B, 4A-4C and 6A-6B are example illustrations of mapping spiking data to radio resources according to some embodiments.

FIG. 2B discloses an example of allocation of radio resources for spiking data. As depicted in FIG. 2B, the spiking data 202 representing one or more spikes are detected at the neuromorphic transmitter node. The transmitter node identifies the identity of neuron emitting the spike. For example, the identity of the neuron may be a neuron address. The neuron addresses could be defined in multiple ways. For example, if there are multiple nodes, the neuron addresses could be defined in a hierarchical manner such that part of the address space encodes the node identity and the neuron identity within the node is encoded in the remaining space.

The neuromorphic transmitter node 102 further determine one or more radio resource elements 206 among a plurality of radio resource elements 204. Further, the neuromorphic transmitter node maps the plurality of radio resource elements associated with radio resources for the transmission of the spiking data 202.

In some embodiments, the radio resources are identified for the transmission of the spiking data 202 among different types of the radio resources. For example, time domain resources, frequency domain resources, code domain resources, and spatial resources. The spatial resources correspond to transmission ranks in multi-layer multiple-input and multiple-output, MIMO, transmission mode.

In another embodiments, the neuromorphic transmitter node identifies a combination of different type of radio resources may for the transmission of the spiking data 202. Further, the neuromorphic transmitter node determines the one or more radio resource elements 206 among the plurality of radio resource elements 204 of each of the combination of radio resources.

Further, the neuromorphic network node maps each spike of the spiking data 202 to the determined one or more radio resource elements 206 to. The mapping of the spikes of the spiking data 202 to the radio resource elements 206 is based on the identity of the neuron emitting the spike. As depicted in FIG. 2B, the spikes of the spiking data 202 are mapped to the radio resource elements 206 in one-dimensional code. However, the radio resource elements 206 can be mapped in multi-dimensional code.

Figure 3:
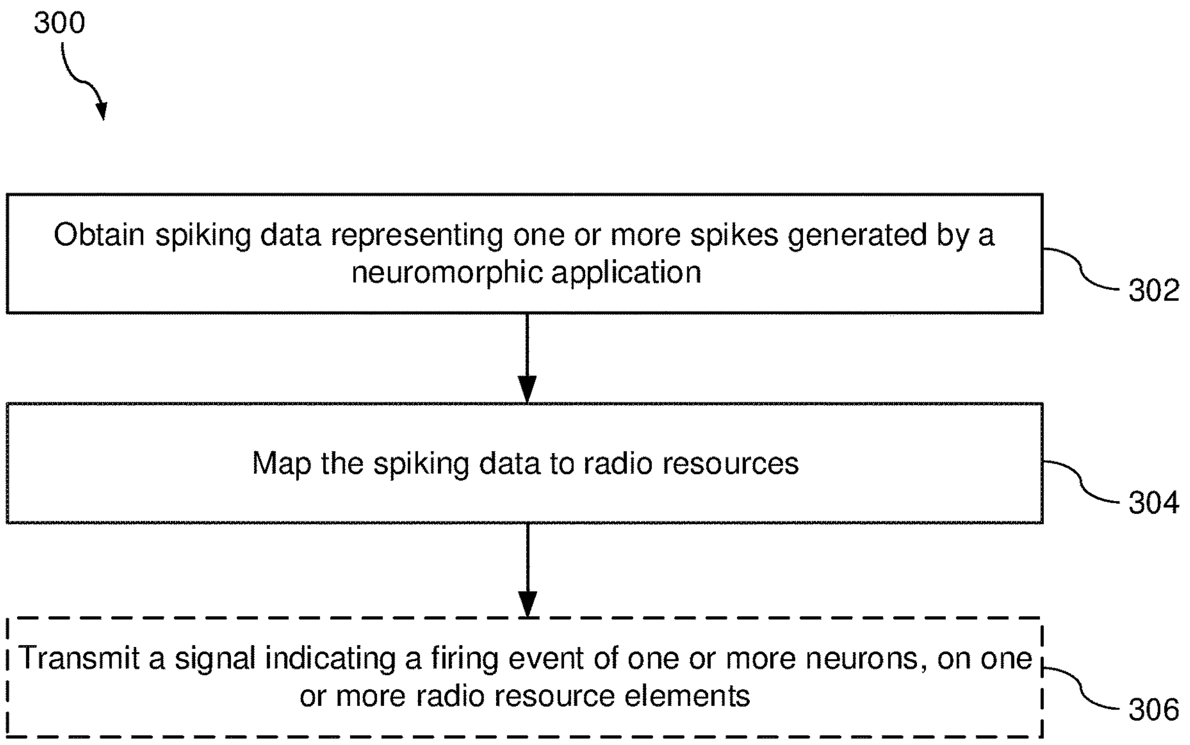
FIG. 3 is a flowchart illustrating example method steps according to some embodiments.

FIG. 3 is a flowchart illustrating example method steps of a method 300 performed by the neuromorphic transmitter node for communication of spiking data on radio resources. At step 302, the method 300 comprises obtaining the spiking data representing one or more spikes generated by a neuromorphic application. In some examples, the neuromorphic application can be executed in the transmitter node 102. For example, the neuromorphic application generates the spikes by using neurons. In some examples, the spiking data can be generated by neuromorphic sensors for example, neuromorphic cameras, touch sensors, or in general any device or a neuromorphic application that makes some computation or sensing in a neuromorphic way. Further, the neuromorphic transmitter node obtains the generated spikes as the spiking data. Further, each spike of the spiking data is associated with the identity of the neuron emitting the spike. For example, each neuron among the plurality of inter-connected neurons has an identity which identifies the corresponding neuron. The identity may be the address of the neuron and the address of each neuron is unique.

At step 304, the method 300 comprises mapping the spiking data to the radio resources. The spiking data is mapped to one or more radio resource elements based on one or more of the identity of the neuron, transmission properties of the one or more spikes and availability of the radio resources.

In some examples, the transmission properties associated with each spike comprises one or more of: an arrival time, an allowed spiking delay, a spiking loss associated with each spike, spiking latency for a group of spikes, a delivery time determined for each spike and a priority level of each spike.

In some examples, the radio resources comprise one or more of: time domain resources, frequency domain resource, code domain resource, and spatial resources. The spatial resources correspond to transmission ranks in multi-layer multiple-input and multiple-output, MIMO, transmission mode. The time domain resources may be an Orthogonal Frequency Division Multiplexing, OFDM, symbol number in a time period around the time when the neuron fired. The frequency domain resources could for example be the OFDM subcarrier within a predefined frequency region. The code domain resources could for example be the number of a code sequence transmitted across time, frequency or spatial domains. Each scalar element of the code sequence corresponds to a time or frequency resource in one spatial dimension. The spatial resources could for example be the set of transmit antennas used or the spatial precoder used for the transmission. Each of the radio resources comprises one or more radio resource elements which is responsible for transmission of data (e.g. spiking data) from the transmitter node to the receiver node through the communication channel.

In some embodiments, the neuromorphic transmitter node maps the signal to a single radio resource corresponding to one sub-carrier in one OFDM symbol. The signal indicates the firing event of the one or more neurons. For example, the single OFDM symbol may be used to encode the identity of the spikes for which the latency requirement is critical. Further, the identity of the spikes is mapped to one sub-carrier in one OFDM symbol.

In some embodiments, the neuromorphic transmitter node identifies the identity of the neuron emitting the spike. For example, the neuromorphic transmitter node identifies the identity of the neuron by which the corresponding spike is generated when the spike is detected by the neuromorphic transmitter node. Each spike of the spiking data corresponds to a unique address associated with the neuron emitting the corresponding spike. The address may be a binary data which represents the neuron.

Further, the neuromorphic transmitter node determines the one or more radio resource elements among a plurality of radio resource elements from the identified identity of the neuron and maps the identity of the neuron to the one or more radio resource elements. The plurality of radio resource elements may be elementary units of any of the radio resources (e.g. time domain resources, frequency domain resource, code domain resource, spatial resources, or a combination thereof). The identity of the neuron is mapped to the radio resource elements using a code, which can be a hash code or a specific code that maps a neuron event to a certain pattern of radio resource elements. The length of the code can be determined, for example, based on an overlap between different neuron mapping space. In some examples, when there are many neurons, length of the code can be increased. In some examples, the length of code may depend on robustness of the spike transmissions. Thus, for more robustness of spike transmissions longer codes are required.

For example, each of the plurality of radio resource elements are associated with the identity of each of the inter-connected neurons. When a neuron fires, the neuromorphic transmitter node identifies the radio resources element associated with the firing neuron based on the identity of that neuron and the neuromorphic transmitter node maps the identity of the neuron to the one or more radio resource elements.

In some embodiments, the neuromorphic transmitter node determines a hash of the identity of the neuron using a hashing function. Instead of using the identity of the neuron directly in the function to obtain the radio resource elements, the identity can be fed through another function (e.g. hash function) before being used as input to determine the radio resource elements. Further, the neuromorphic transmitter node determines the one or more radio resource elements from a plurality of radio resource elements using the hash.

Figures 4A, 4B, 4C:
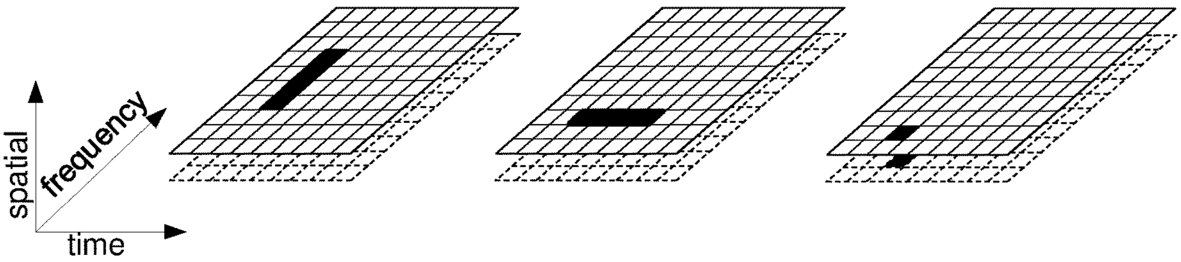

Furthermore, the neuromorphic transmitter node maps the identity of the neuron to the one or more radio resource elements. The mapping may be illustrated in FIGS. 4A, 4B, and 4C. Assuming, in three dimensional plane, x axis be time axis, y axis be frequency axis, and z axis be special axis. As depicted in FIG. 4A, the identity of the neuron is mapped to the one or more radio resource elements in frequency domain. Therefore, the radio resource elements are allocated for the transmission in frequency axis (i.e. y-axis). As depicted in FIG. 4B, the identity of the neuron is mapped to the one or more radio resource elements in time domain. Therefore, the radio resource elements are allocated for the transmission in time axis (i.e. x-axis). As depicted in FIG. 4C, the identity of the neuron is mapped to the one or more radio resource elements in spatial domain. Therefore, the radio resource elements are allocated for the transmission in spatial axis (i.e. z-axis).

Figures 6A, 6B:
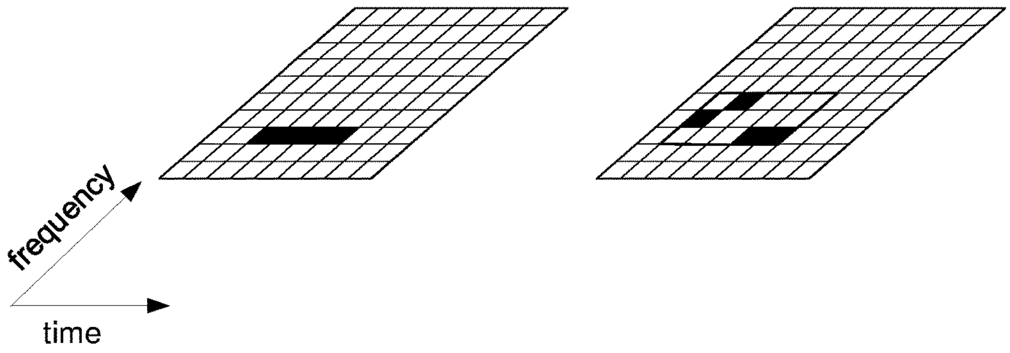

In some embodiments, the identity of neuron may be mapped to the radio resource elements in a single-dimensional sequence (e.g. time domain sequence, frequency domain sequence, or spatial domain sequence). In some embodiments, the address of the neuron is mapped to the radio resource elements in a multi-dimensional sequence. FIGS. 6A and 6B illustrate example of the single-dimensional sequence and the multi-dimensional sequence. As depicted in FIG. 6A, the identity of neuron may be mapped to the radio resource elements in a time domain sequence. Further, as depicted in FIG. 6B, the identity of neuron may be mapped to the radio resource elements in a time-frequency sequence (two-dimensional sequence).

Furthermore, the neuromorphic transmitter node transmits a signal indicating a firing event of one or more neurons, on one or more radio resource elements as depicted in an optional step 306 of method 300. The firing event is associated with an event when the neuron fires or when the neuron emits the spike. The neuromorphic transmitter node determines the signal when the neuron emits the spike. For example, when the neuron fires (i.e. firing event), the neuromorphic transmitter node transmits the signal having a non-zero value. In contrast, when the neuron does not fire (i.e. non-firing event), the neuromorphic transmitter node does not transmit any signal. For example, the radio resources are idle in case of non-firing event. Therefore, there are no power used for transmission of the signal in non-firing event. As a result, an advantage associated with the one or more embodiments described in this disclosure is that the transmission is power efficient.

The neuromorphic transmitter node identifies a time interval associated with the firing event. For example, the neuromorphic transmitter node identifies the time interval of the firing event at the time of the detection of the spiking data. Each spike of the spiking data is generated by the neuron at a specific time interval. Further, the neuromorphic transmitter node encodes the identity of neuron and the time interval.

Figure 5:
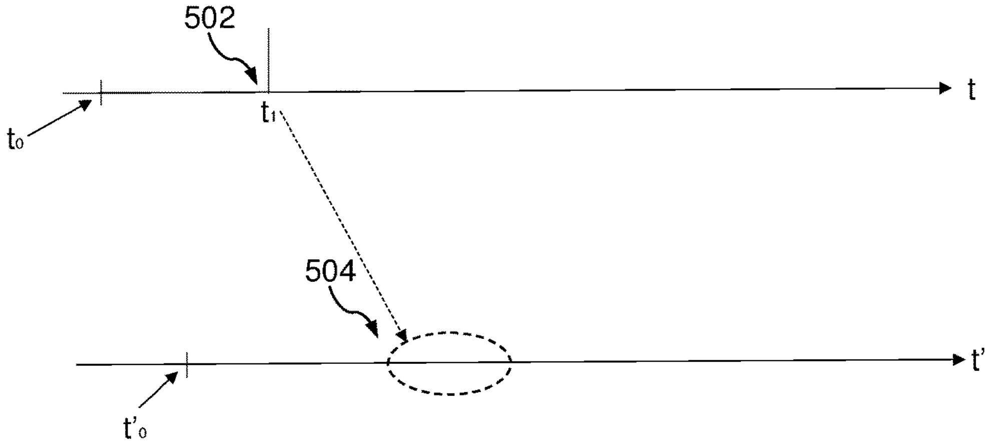
FIG. 5 is an example illustrating transmission of spiking data as a result of firing of a neuron.

FIG. 5 is an example illustrating transmission of spiking data as a result of a neuron firing. As depicted in FIG. 5, the neuron emits the spike at time interval 502 (i.e. application time $t_1$). The neuromorphic transmitter node determines a transmission time for the generated spike at which the transmission of the spike occurs. There could be different time references for the spike in an application layer associated with the neuron and the radio layer at which transmission occurs. For example, as illustrated in FIG. 5, the time reference for the application layer is t having reference point at to and the time reference for the radio layer is t' having the reference point at $t'_0$. The spike can occur at any point in time but transmission can only occur during transmission period. The neuromorphic transmitter node maps the application time $t_1$ to the transmission time in the radio layer at with the transmission to be occurred.

The neuromorphic transmitter node further identifies a strength of the firing event. For example, the neuromorphic transmitter node acquires the strength of the firing event at the time of the detection of the spiking data. Each spike of the spiking data is generated with a specific strength. The strength of the spike indicates an amplitude of intensity change at the time of generation of the spike.

The neuromorphic transmitter node encodes one or more of the identity of the neuron, the time interval and the strength of the firing event with the one or more radio resource elements. The neuromorphic transmitter node further transmits the signal indicating the firing event encoded with one or more of the address of the neuron, the time interval and the strength of the firing event using the one or more radio resource elements.

In some embodiments, the transmitter node detects a firing event when a plurality of neurons fire simultaneously. For example, a plurality of neurons may fire simultaneously and generates one or more spikes. The neuromorphic transmitter node further determines individual signals indicating the firing event at each of the plurality of neurons. For example, each spike of the plurality of spikes fired simultaneously comprises an individual signal. The neuromorphic transmitter node determines a sum of the individual signal values. The sum of the individual signal values is determined by adding each of the individual signal values. The neuromorphic transmitter node further transmits the sum of the individual signal values on the one or more radio resource elements.

Furthermore, the neuromorphic transmitter node modulates the spiking data to be transmitted to the neuromorphic receiver node. The spiking data may be modulated by using an appropriate modulation method. The modulation method is selected depending upon the radio technology used for the transmission of the spiking data. For example, when there is spiking data transmission on an OFDM symbol, which is associated with a neuron, it is sufficient to send a particular base symbol and detect only the power at the receiver node. Since the neuromorphic transmitter node is not transmitting 0's and 1's as in traditional digital communication, there is no need to employ digital modulation techniques. This also makes the reception easier, since channel estimation and equalization can be omitted, phase coherent channel reconstruction is not needed. These components can be removed from a spike optimized radio stack. Some coarse channel estimation might be included to assess the channel attenuation and compensate for that during power detection.

Therefore, the unique transmission properties of spikes are considered in the communication of spiking data in the wireless transmission scheme. Thus, the spiking data can be communicated in the wireless communication network more efficiently. Thus, an alternative and improved approaches are provided for communication of spiking data on the radio resources.

Figure 7:
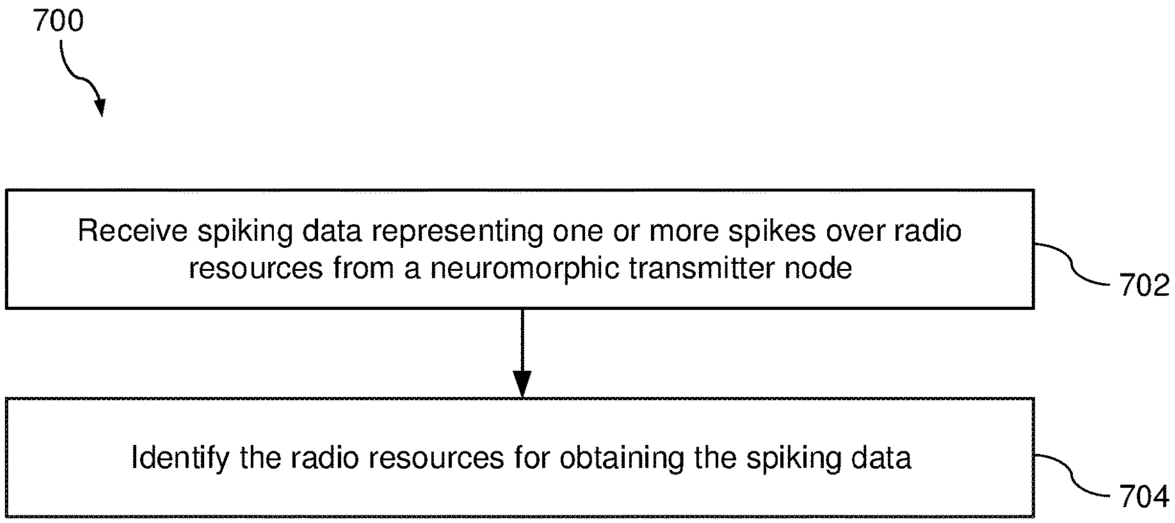
FIG. 7 is a flowchart illustrating example method steps according to some embodiments.

FIG. 7 is a flowchart illustrating example method steps of a method 700 performed by a neuromorphic receiver node for reception of the spiking data.

At step 702, the method 700 comprises receiving the spiking data representing one or more spikes over radio resources from a neuromorphic transmitter node, wherein each spike is associated with an identity of a neuron emitting the spike. The radio resources comprises one or more radio resource elements which are elementary units of the radio resources. For example, the radio resources comprise one or more of time domain resources, frequency domain resource, code domain resource, and spatial resources.

At step 704, the method 700 comprises identifying the radio resources for obtaining the spiking data, wherein the one or more spikes are obtained by identifying one or more radio resource elements for obtaining the one or more spikes. For example, the neuromorphic receiver node identifies the radio resource elements used for the transmission of the spiking data. Further, the neuromorphic receiver node obtains the one or more spikes using the identified radio resource elements.

In some embodiments, the neuromorphic receiver node determines a signal indicating one or more spikes on the one or more radio resource elements. For example, the neuromorphic receiver node may extract the signal from the received spiking data. The signal is associated with each spikes in the spiking data.

Further, the neuromorphic receiver node decodes the signal on the one or more radio resource elements for determining an identity of each neuron. The identity of each neurons is associated with one or more radio resource elements. The neuromorphic receiver node determines the identity of each neuron emitting the spike based on the one or more radio resource elements. The neuromorphic receiver node further determines a time interval associated with a firing event of each neuron and a strength of the firing event.

In some embodiments, the neuromorphic receiver node detects presence of power on the one or more radio resource elements without performing demodulation of the one or more radio resource elements. For example, when the neuron fires (i.e. firing event), the neuromorphic transmitter node transmits the signal having a non-zero value. In contrast, when the neuron does not fire (i.e. non-firing event), the neuromorphic transmitter node does not transmit any signal. For example, the radio resources are idle in case of non-firing event. Therefore, there is no power used for transmission of the signal in non-firing event. As a result, an advantage associated with the one or more embodiments described in this disclosure is that the transmission is power efficient.

Figure 8:
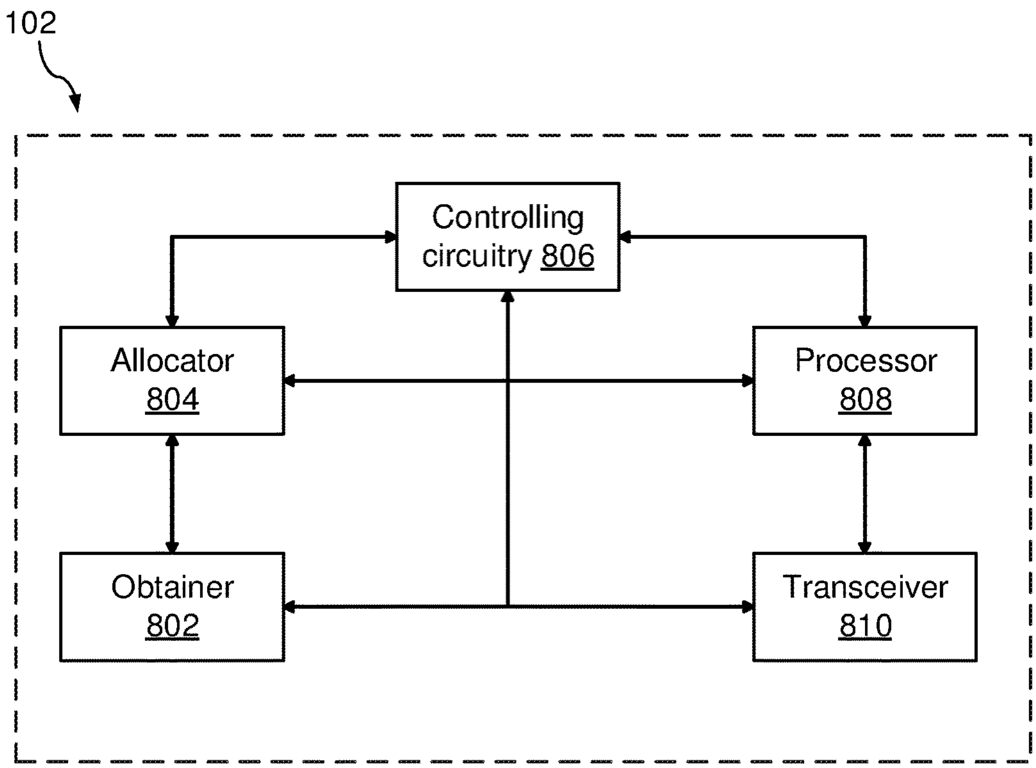
FIG. 8 is a schematic block diagram illustrating an example apparatus according to some embodiments.

FIG. 8 is an example schematic diagram showing an apparatus 102. The apparatus 102 may e.g. be comprised in a neuromorphic transmitter node. The apparatus 102 may be configured to cause performance of the method 300 for communication of the spiking data on radio resources.

According to at least some embodiments of the present invention, the apparatus 102 in FIG. 8 comprises one or more modules. These modules may e.g. be an obtainer 802, an allocator 804, a controlling circuitry 806, a processor 808, and a transceiver 810. The controlling circuitry 806, may in some embodiments be adapted to control the above mentioned modules.

The obtainer 802, the allocator 804, the processor 808, the transceiver 810 as well as the controlling circuitry 806, may be operatively connected to each other.

It can be mentioned that the allocator 804 may be merged into the processor 808, which may be called a data processor, potentially also covering the controlling circuitry 806.

Optionally, the obtainer 802 may be adapted to obtain the spiking data representing one or more spikes generated by the neuromorphic application. The allocator 804 may be adapted to map the spiking data to the radio resources. The transceiver 810 may be adapted to transmit the signal indicating a firing event of one or more neurons to a neuromorphic receiver node.

The controlling circuitry 806 may be adapted to control the steps as executed by the neuromorphic transmitter node 102. For example, the controlling circuitry 806 may be adapted to obtain the spiking data representing one or more spikes generated by the neuromorphic application and map the spiking data to the radio resources. Thus, the controlling circuitry 806 may be adapted to communicate the spiking data with the receiver node (as described above in conjunction with the method 300 and FIG. 3).

Figure 9:
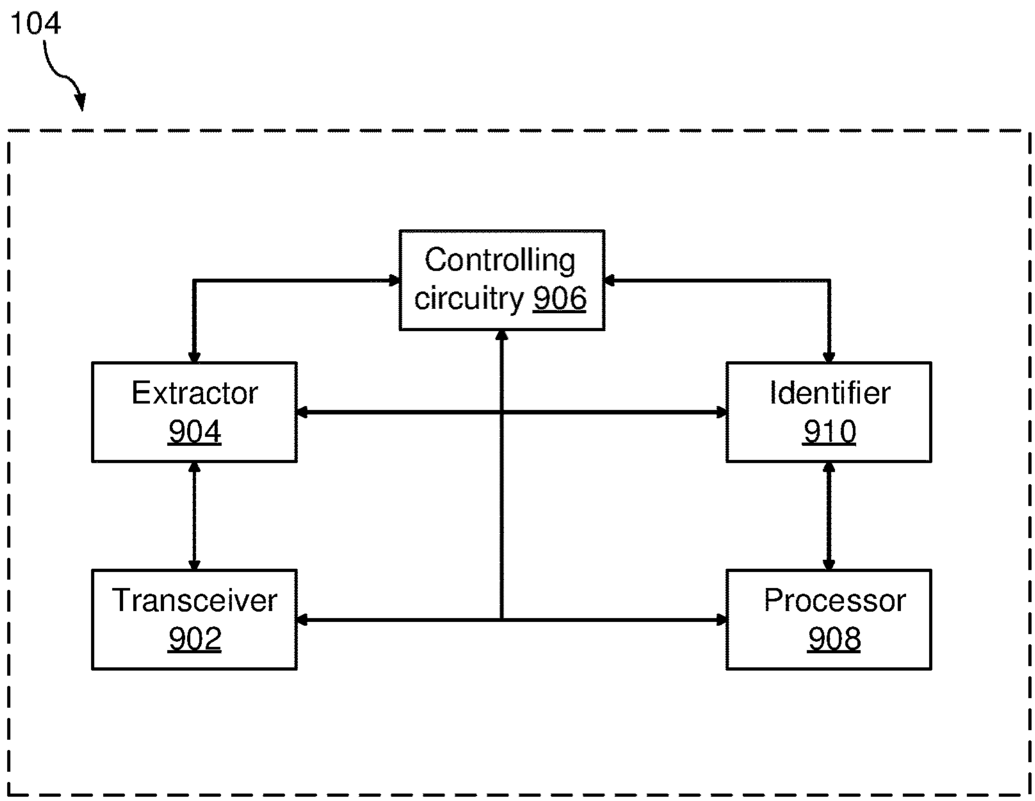
FIG. 9 is a schematic block diagram illustrating an example apparatus according to some embodiments.

FIG. 9 is an example schematic diagram showing an apparatus 104. The apparatus 104 may e.g. be comprised in a neuromorphic receiver node. The apparatus 104 is capable of reception of the spiking data and may be configured to cause performance of the method 700 for reception of the spiking data.

According to at least some embodiments of the present invention, the apparatus 104 in FIG. 9 comprises one or more modules. These modules may e.g. be a transceiver 902, an extractor 904, a controlling circuitry 906, a processor 908, and an identifier 910. The controlling circuitry 906, may in some embodiments be adapted to control the above mentioned modules.

The transceiver 902, the extractor 904, the controlling circuitry 906, the processor 908 as well as the identifier 910, may be operatively connected to each other.

Optionally, the transceiver 902 may be adapted to receive the spiking data representing one or more spikes over the radio resources from the neuromorphic transmitter node.

The extractor 904 may be adapted to extract identity from one or more radio resource elements.

The controlling circuitry 906 may be adapted to determine a signal indicating one or more spikes on the one or more radio resource elements.

Further, the identifier 906 may be adapted to identify the radio resources for obtaining the spiking data (as described above in conjunction with the method 700 and FIG. 7).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
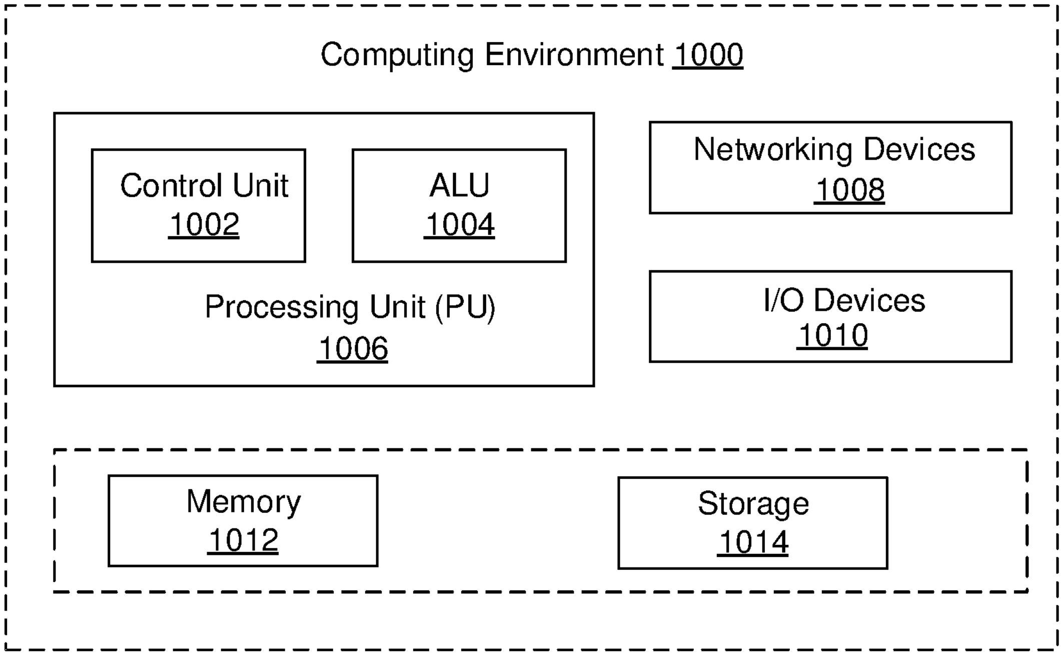
FIG. 10 discloses an example computing environment according to some embodiments.

FIG. 10 illustrates an example computing environment 1000 implementing a method and the neuromorphic transmitter node and the neuromorphic receiver node as described in FIG. 3 and FIG. 7. As depicted in FIG. 10, the computing environment 1000 comprises at least one processing unit 1006 that is equipped with a control unit 1002 and an Arithmetic Logic Unit, ALU 1004, a plurality of networking devices 1008 and a plurality Input output, I/O devices 1010, a memory 1012, a storage 1014. The processing unit 1006 may be responsible for implementing the method described in FIG. 3 and FIG. 7. For example, the processing unit 1006 may in some embodiments be equivalent to the processor of the neuromorphic transmitter node and the neuromorphic receiver node described above in conjunction with the FIGS. 1-9. The processing unit 1006 is capable of executing software instructions stored in memory 1012. The processing unit 1006 receives commands from the control module 1002 in order to perform its processing. Further, any logical and arithmetic operations involved in the execution of the instructions are computed with the help of the ALU 1004.

The computer program is loadable into the processing unit 1006, which may, for example, be comprised in an electronic apparatus (such as a UE or a network node). When loaded into the processing unit 1006, the computer program may be stored in the memory 1012 associated with or comprised in the processing unit 1006. According to some embodiments, the computer program may, when loaded into and run by the processing unit 1006, cause execution of method steps according to, for example, any of the methods illustrated in FIGS. 3 and 7 or otherwise described herein.

The overall computing environment 1000 may be composed of multiple homogeneous and/or heterogeneous cores, multiple CPUs of different kinds, special media and other accelerators. Further, the plurality of processing units 1006 may be located on a single chip or over multiple chips.

The algorithm comprising of instructions and codes required for the implementation are stored in either the memory 1012 or the storage 1014 or both. At the time of execution, the instructions may be fetched from the corresponding memory 1012 and/or storage 1014, and executed by the data processing module 1006.

In case of any hardware implementations various networking devices 1008 or external I/O devices 1010 may be connected to the computing environment to support the implementation through the networking devices 1008 and the I/O devices 1010.

The embodiments disclosed herein can be implemented through at least one software program running on at least one hardware device and performing network management functions to control the elements. The elements shown in FIG. 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for communication of spiking data on radio resources, the method being performed by a neuromorphic transmitter node, in a wireless communication network, the method comprising:

obtaining the spiking data representing one or more spikes generated by a neuromorphic application, wherein each spike is associated with an identity of a neuron emitting the spike; and mapping the spiking data to the radio resources, wherein the spiking data is mapped to one or more radio resource elements based on one or more of: the identity of the neuron, transmission properties of the one or more spikes and availability of the radio resources.

2. The method according to claim 1, further comprising:

transmitting a signal indicating a firing event of one or more neurons, on the one or more radio resource elements, the firing event is associated with an event when the neuron fires or when the neuron emits the spike.

3. The method according to claim 1, wherein the radio resources comprise one or more of: time domain resources, frequency domain resources, code domain resources, and spatial resources.

4. The method according to claim 1, wherein the spatial resources correspond to transmission ranks in multi-layer multiple-input and multiple-output, MIMO, transmission mode.

5. The method according to claim 2, wherein the step of transmitting a signal indicating the firing event of one or more neurons, on the one or more radio resource elements comprises:

identifying a time interval associated with the firing event and encoding one or more of: identity of the neuron and the time interval.

6. The method according to claim 5, further comprising:
detecting a firing event when a plurality of neurons fire simultaneously;
determining individual signals indicating the firing event at each of the plurality of neurons;
determining a sum of the individual signal values; and
transmitting the sum of the individual signal values on the one or more radio resource elements.

7. The method according to claim 1, the step of mapping the spiking data to the radio resources comprises:
mapping the signal to a single radio resource corresponding to one sub-carrier in one orthogonal frequency-division multiplexing, OFDM, symbol.

8. The method according to claim 1, wherein the identity of the neuron emitting the spike is mapped to one sub-carrier in one OFDM symbol.

9. The method according to claim 1, wherein the step of mapping the spiking data to the radio resources comprises:
identifying the identity of the neuron emitting the spike;
determining the one or more radio resource elements among a plurality of radio resource elements from the identity of the neuron; and
mapping the identity of the neuron to the one or more radio resource elements.

10. The method according to claim 1, wherein the step of mapping the spiking data to the radio resources comprises:
identifying the identity of the neuron emitting the spike;
determining a hash for the identity of the neuron using a hashing function; and
determining the one or more radio resource elements from a plurality of radio resource elements based on the hash.

11. A method for reception of spiking data, the method being performed by a neuromorphic receiver node, in a wireless communication network, the method comprising:
receiving the spiking data representing one or more spikes over radio resources from a neuromorphic transmitter node, wherein each spike is associated with an identity of a neuron emitting the spike; and
identifying the radio resources for obtaining the spiking data, wherein the one or more spikes are obtained by identifying one or more radio resource elements for obtaining the one or more spikes.

12. The method according to claim 11, wherein the radio resources comprise one or more of: time domain resources, frequency domain resources, code domain resources, and spatial resources.

13. The method according to claim 11, wherein the step of identifying the radio resources for obtaining the spiking data comprises:
determining a signal indicating one or more spikes on the one or more radio resource elements; and
decoding the signal on the one or more radio resource elements for determining an identity of each neuron, a time interval associated with a firing event of each neuron.

14. The method according to claim 11, wherein the step of identifying the radio resources for obtaining the spiking data comprises:
detecting presence of power on the one or more radio resource elements without performing demodulation of the one or more radio resource elements.

15. An apparatus of a neuromorphic transmitter node configured to operate in a wireless communication network for communication of spiking data on radio resources, the apparatus comprising a controlling circuitry configured to cause:
obtaining of the spiking data representing one or more spikes generated by a neuromorphic application, wherein each spike is associated with an identity of a neuron emitting the spike; and
mapping of the spiking data to the radio resources, wherein the spiking data is mapped to one or more radio resource elements based on one or more of: the identity of the neuron, transmission properties of the one or more spikes and availability of the radio resources.

16. An apparatus of a neuromorphic receiver node configured to operate in a wireless communication network for reception of spiking data, the apparatus comprising a controlling circuitry configured to cause:
reception of the spiking data representing one or more spikes over radio resources from a neuromorphic transmitter node, wherein each spike is associated with an identity of a neuron emitting the spike; and
identification of the radio resources for obtaining the spiking data, wherein the one or more spikes are obtained by identifying one or more radio resource elements for obtaining the one or more spikes.

* * * * *